United States Patent [19]
Claffey-Cohen et al.

[11] Patent Number: 5,553,306
[45] Date of Patent: Sep. 3, 1996

[54] METHOD AND APPARATUS FOR CONTROLLING PARALLEL PORT DRIVERS IN A DATA PROCESSING SYSTEM

[75] Inventors: Margaret Claffey-Cohen, Jupiter; Phat T. Le, Boca Raton; Timothy J. Louie, Boca Raton; Alan F. Neel, II, Boca Raton; James P. Ward, Boca Raton, all of Fla.

[73] Assignee: International Business Machines Corporation, Armonk, N.Y.

[21] Appl. No.: 301,512

[22] Filed: Sep. 7, 1994

Related U.S. Application Data

[63] Continuation of Ser. No. 998,175, Dec. 29, 1992, abandoned.

[51] Int. Cl.$^6$ .............................. G06F 3/00; G06F 13/00
[52] U.S. Cl. ..................... 395/828; 364/DIG. 1; 364/235; 364/238.2; 364/239.2; 364/240.7; 364/241; 395/284; 307/412
[58] Field of Search ...................................... 395/275, 325, 395/800, 828, 284; 307/468, 456, 214, 443; 375/7

[56] References Cited

U.S. PATENT DOCUMENTS

| | | | |
|---|---|---|---|
| 3,824,408 | 7/1974 | Brunel | 307/214 |
| 4,251,737 | 2/1981 | Gaudenzi | 307/209 |
| 4,339,675 | 7/1982 | Ramsey | 307/473 |
| 4,339,676 | 7/1982 | Ramsey | 307/473 |
| 4,490,631 | 12/1984 | Kung | 307/456 |
| 4,721,867 | 1/1988 | Headen, Jr. et al. | 307/456 |
| 4,801,825 | 1/1989 | Stanley et al. | 307/473 |
| 4,825,404 | 4/1989 | Theus | 395/325 |
| 4,833,349 | 5/1989 | Liu et al. | 307/468 |
| 4,841,484 | 6/1989 | Watanabe et al. | 365/190 |
| 4,912,724 | 5/1990 | Wilson | 375/7 |
| 4,987,319 | 1/1991 | Kawana | 307/465 |
| 4,991,085 | 2/1991 | Pleva et al. | 395/275 |
| 5,122,690 | 6/1992 | Bianchi | 307/475 |
| 5,132,562 | 7/1992 | Chan et al. | 307/443 |
| 5,212,801 | 5/1993 | Farmer | 395/800 |
| 5,239,627 | 8/1993 | Beck et al. | 395/275 |

*Primary Examiner*—Ayaz R. Sheikh
*Attorney, Agent, or Firm*—Duke W. Yee; Andrew J. Dillon

[57] ABSTRACT

A parallel port interface for utilization between a first device and a second device designated by a user for transmitting a digital signal from the device to the second device. The parallel port interface includes a switchable driver circuit for transmitting the digital signal, which includes a first circuit for emulating an open collector circuit and a second circuit for emulating a totem pole circuit. The switchable driver circuit is controlled by a logic control circuit that automatically selects either the first circuit or the second circuit for transmitting the digital signal in response to the digital signal and a designation of the second device.

4 Claims, 5 Drawing Sheets

METHOD AND APPARATUS FOR CONTROLLING PARALLEL PORT DRIVERS IN A DATA PROCESSING SYSTEM

This is a continuation of application Ser. No. 07/998,175 filed on Dec. 29,1992, now abandoned.

BACKGROUND OF THE INVENTION

1. Technical Field:

The present invention relates in general to interfaces for transmitting data within a data processing system and in particular to interfaces utilizing logical drivers to transmit data within a data processing system. Still more particularly, the present invention relates to parallel port interfaces utilizing logical drivers to transmit data within a data processing system.

2. Description of the Related Art:

For cable communications with high speed peripherals, parallel transmission utilizing parallel port interfaces are favored over serial communication systems in data processing systems. Many parallel port interfaces utilize drivers configured as a so-called "open collector" driver circuit. This type of circuit has been widely utilized in parallel port interfaces for data processing systems. "Open collector" drivers, however, have a slow rise time that is usually not considered critical as long as the overall speed of the parallel port interface is limited to under 200 kilobytes per second. Newer parallel port interfaces passes higher speed capabilities to allow for faster transmission of data. These high speed drivers typically utilize a "push-pull" or "totem pole" configuration to provide for faster transmission of data. One drawback of such high speed drivers is that they are often not compatible with many existing parallel connect devices.

For example, many devices designed to communicate with a parallel port interface utilizing "open collector" driver outputs may drive more than one output simultaneously. In such a situation, the drivers in the device may be active low wired "OR". High speed drivers utilizing a "push-pull" type configuration may function incorrectly if more than one "totem pole" is utilized to drive a bus at the same time. A "bus" is defined as an electrical signal pathway that connects one or more outputs to one or more inputs. Bus is a broad term that covers any trace or wire connecting integrated circuits or other electrical devices. As a result, circuit designers must design interface circuits containing totem pole type drivers in which only one driver on the same bus may be enabled at any one time.

Additionally, many devices designed to communicate with parallel port interfaces containing open collector drivers sometimes include lines that are connected to a so-called "hard" ground. In such a situation, connecting this type of device with a parallel port interface utilizing a totem pole driver system might result in damage to the parallel port interface.

Therefore, it would be desirable to have a parallel port interface that would allow for full compatibility with existing driver interfaces as well as provide for high speed capabilities.

SUMMARY OF THE INVENTION

It is therefore one object of the present invention to provide improved interfaces for transmitting data within a data processing system.

It is another object of the present invention to provide an improved parallel port interface within a data processing system.

It is yet another object of the present invention to provide an improved parallel port interface utilizing logical drivers to provide selectable signal speeds for transmitting data.

The foregoing objects are achieved as is now described. The present invention permits a digital signal to be transmitted from a first device to a second device, designated by a user, utilizing a parallel port interface interposed between the first device and the second device. The parallel port interface includes a switchable driver circuit for transmitting the digital signal, which includes a first circuit for emulating an open collector circuit and a second circuit for emulating a totem pole circuit. The switchable driver circuit is controlled by a logic control circuit that automatically selects either the first circuit or the second circuit for transmitting the digital signal in response to the digital signal and a designation of the second device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
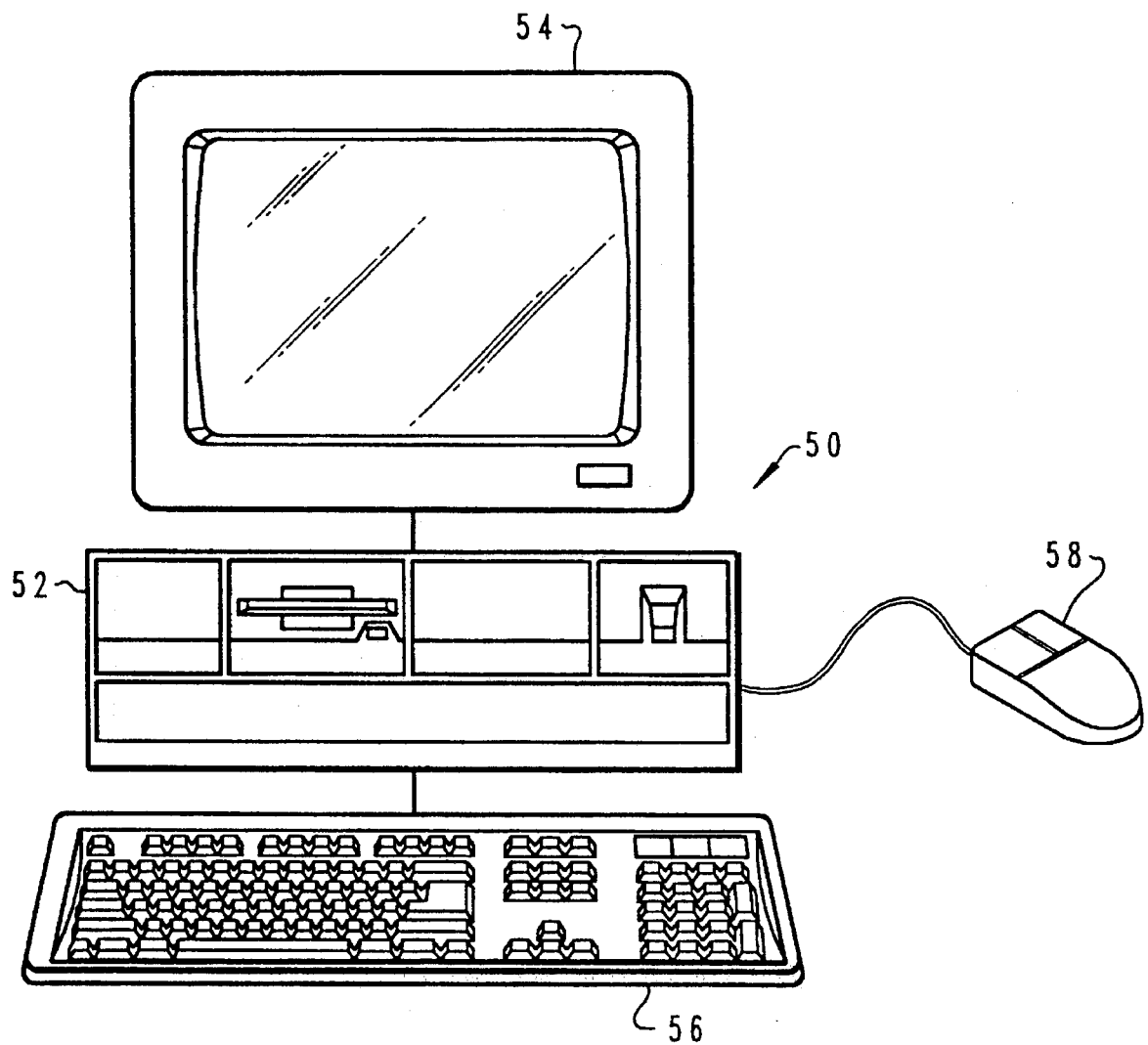
FIG. 1 is a pictorial representation of a personal computer that may be utilized to implement a method and system of the present invention.

With reference now to the figures and in particular with reference to FIG. 1, there is depicted a pictorial representation of a computer system in which the present invention may be implemented in accordance with a preferred embodiment of the present invention. A personal computer 50 is depicted which includes a system unit 52, a video display terminal 54, a keyboard 56, and a mouse 58. Personal computer 50 may be implemented utilizing any suitable computer such as an IBM PS/2 computer, a product of International Business Machines Corporation, located in Armonk, N.Y. "PS/2" is a registered trademark of International Business Machines Corporation, located in Armonk, N.Y. Although the depicted embodiment involves a personal computer, a preferred embodiment of the present invention may be implemented in other types of data processing systems, such as for example, intelligent work stations or mini-computers.

Figure 2:
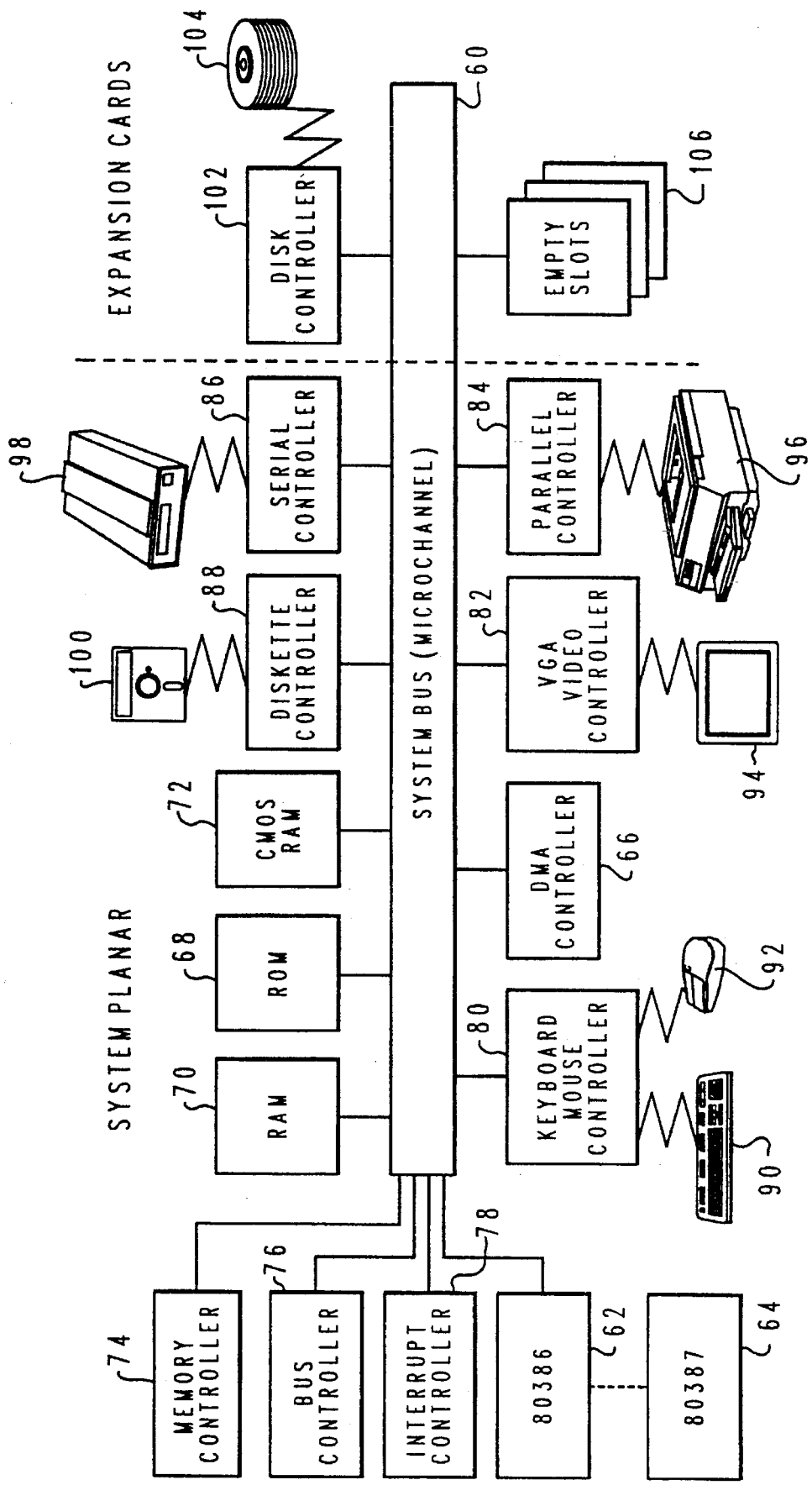
FIG. 2 depicts a block diagram of selected components in the personal computer illustrated in FIG. 2 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST) and the Basic Input/Output System (BIOS) which control hardware operations, such as those involving disk drives and the keyboard. Read only memory (ROM) 68 is mapped into the microprocessor 62 address space in the range from 640K to 1 megabyte. CMOS RAM 72 is attached to system bus 60 and contains system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel port controller or interface 84, serial controller 86, and diskette controller 88. Keyboard and mouse controller 80 provide a hardware interface for keyboard 90 and mouse 92. Video controller 82 provides a hardware interface for video display terminal 94. Parallel port interface 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Figure 3:
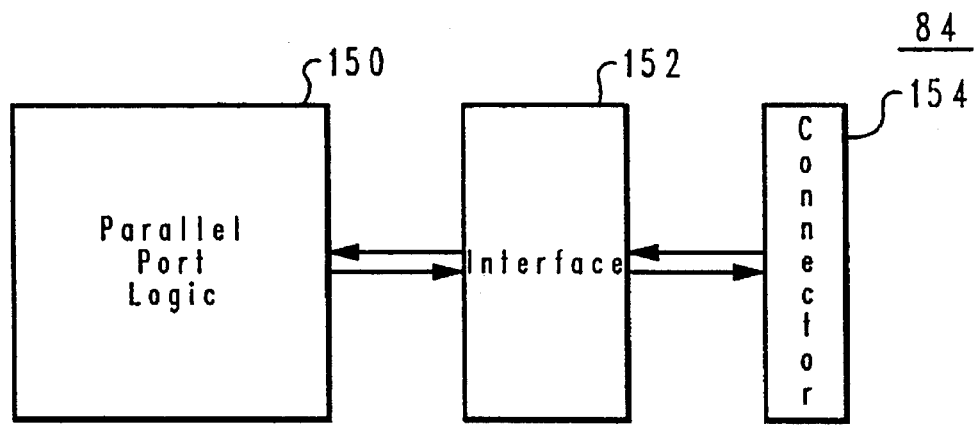
FIG. 3 is a block diagram illustrating a parallel port interface in accordance with a preferred embodiment of the present invention.

Referring now to FIG. 3, a block diagram illustrating a parallel port interface in accordance with a preferred embodiment of the present invention is depicted. Parallel port interface 84 includes parallel port logic 150, interface unit 152, and connector 154. Parallel port logic 150 receives and sends data to the data processing system via system bus 60. Interface unit 152 contains drivers for parallel port interface 84. Connector 154 provides a physical connection to a cable that may be attached to another device capable of parallel data transmissions.

Figure 4:
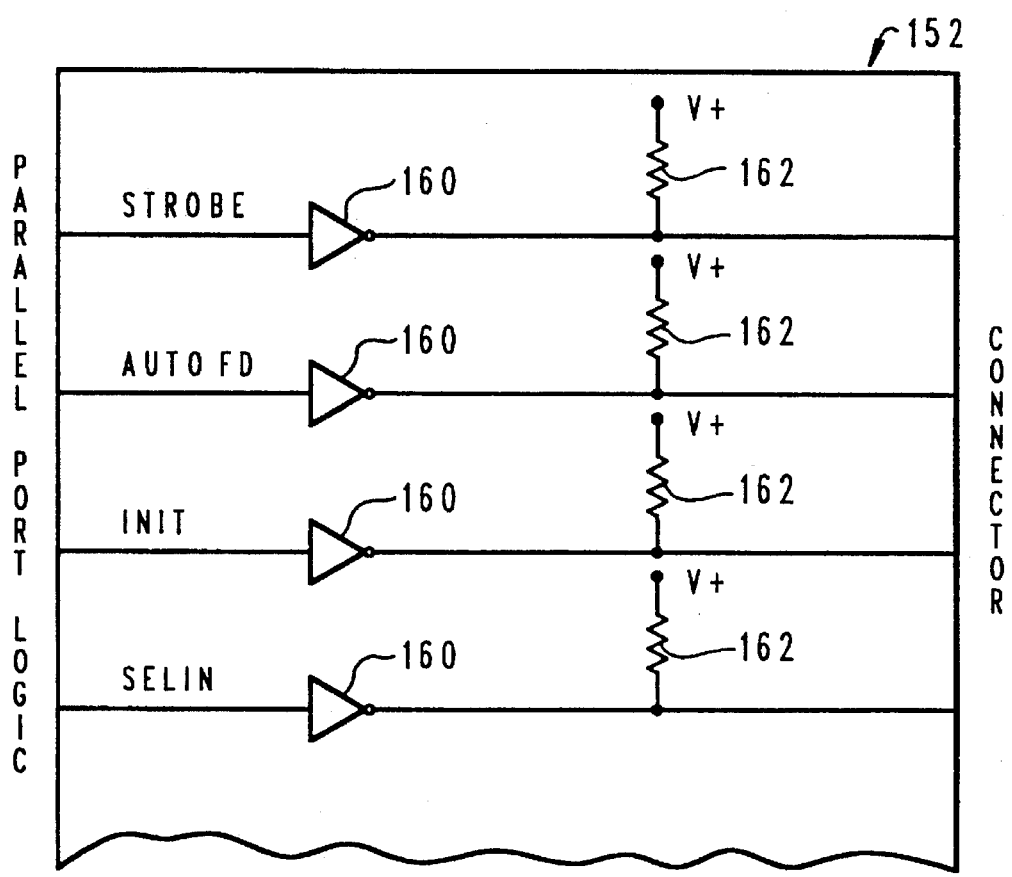
FIG. 4 depicts a schematic diagram illustrating an interface unit constructed with prior art open collector drivers.

Referring now to FIG. 4, a schematic diagram illustrating an interface unit constructed with prior art open collector drivers is depicted. Interface unit 152 may contain a series of drivers for sending well known signals such as, for example, STROBE, AUTOFD, INIT, and SELIN. STROBE is a signal causing data to be clocked from parallel port interface 84 to a device connected to connector 154 via a cable. AUTOFD typically is an automatic feed signal for spacing paper up on a printer connected to parallel port interface 84. INIT is a signal utilized to initialize the printer, and SELIN is a signal employed to select a device. Other drivers (not shown) may be included in interface unit 152 for sending other various signals well known to those in the art.

Each driver includes inverter 160 and pull up resistor 162. Invertor 160 is a transistor-transistor logic (TTL) circuit that is in an open collector configuration. One advantage of this "open collector" circuit is that a single line may be shared among the outputs of several drivers. An "open collector" circuit simply omits a connection between the collector of the transistor in the output stage of inverter 160. Pullup resistor 162 is typically connected to a positive voltage source such as a five volt DC source. The output of the driver 160 is connected to connector 154 while the input of driver 160 is coupled to parallel port logic 150.

Figure 5:
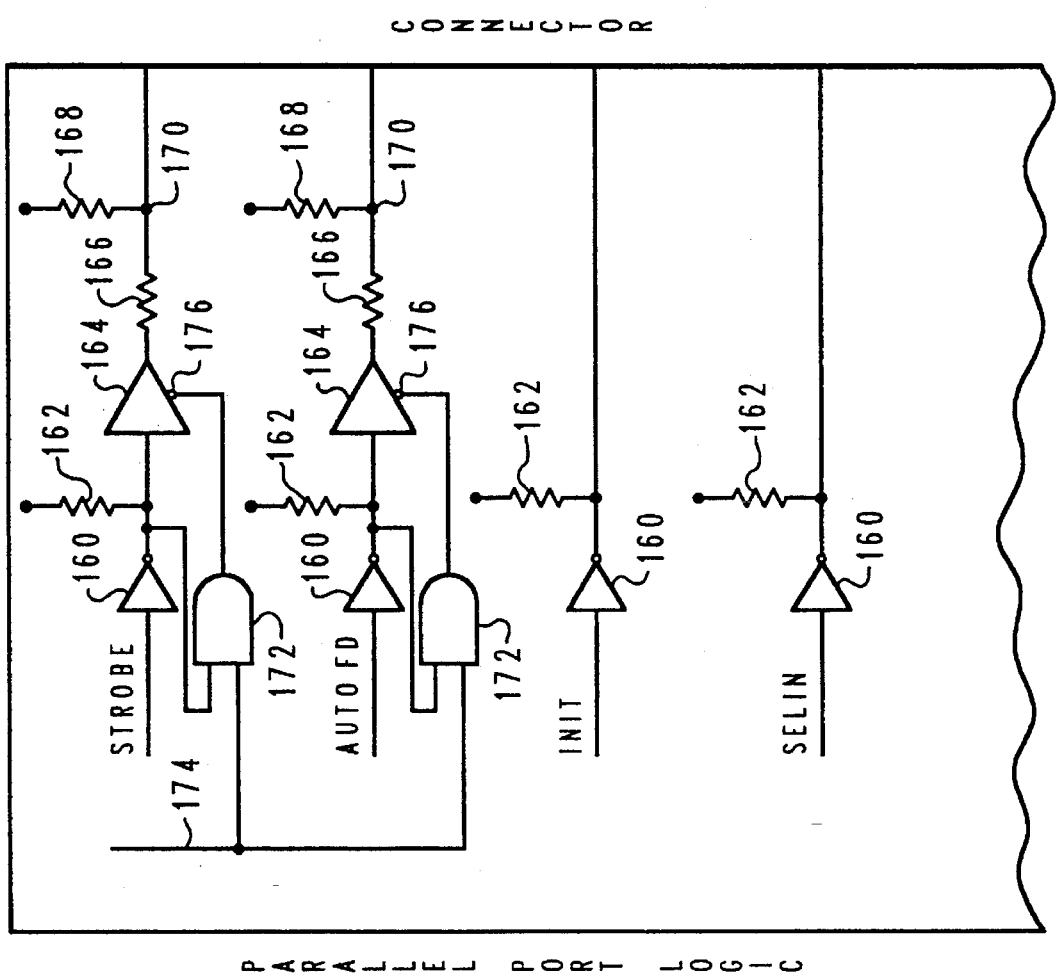
FIG. 5 is a schematic diagram depicting an interface unit including a driver circuit in accordance with a preferred embodiment of the present invention.

In accordance with a preferred embodiment of the present invention, an improved driver system is provided as depicted in FIG. 5. FIG. 5 illustrates an interface unit which includes drivers provided in accordance with a preferred embodiment of the present invention. The improved driver includes inverter 160, having an output coupled to pullup resistor 162. In addition, the output of inverter 160 also is coupled to the input of three-state logic TTL 164. Three-state logic TTL 164 has an output connected in series with resistor 166 and pullup resistor 168. Output node 170 is located between resistor 166 and pullup resistor 168. Output node 170 is coupled to connector 154 to provide a signal to a device coupled to parallel controller 84. The improved driver also includes logic gate 172, which has an input connected to the output of inverter 160 and an input connected to control line 174. The output of logic gate 172 is coupled to enable input 176 in three-state logic TTL 164. Logic gate 172 is an AND gate in accordance with a preferred embodiment of the present invention.

As illustrated, this driver design is capable of emulating both an open collector circuit and a high speed "totem pole" circuit. Three-state logic TTL 164 provides a "totem pole" or "push-pull" configuration for allowing active rise and sinking of current, while transferring data in a high speed mode, in accordance with a preferred embodiment of the present invention. Three-state logic TTL 164 operates like an ordinary active pullup logic circuit when enabled, providing a logic "1" or a logic "0" output. When the three-state logic TTL 164 is disabled, the output of three-state logic circuit TTL 164 behaves as a high-impedance load or an open circuit. Enablement and disablement of the active pullup output is controlled by enable input 174 and is disabled when a logic "1" is input into enable input 174. In accordance with a preferred embodiment of the present invention, three-state logic TTL 164 is enabled when a logic "0" is input into enable input 174. In accordance with a preferred embodiment of the present invention, inverter 160 may be provided utilizing a S05 inverter available from Signetics Corporation headquartered in Sunnyvale, Calif. Three-state logic TTL 164 is a LS125 also available from Signetics Corporation in accordance with a preferred embodiment of the present invention.

The enablement and disablement of three-state logic TTL 164 is determined from the output of inverter 160 and the signal from control line 176. Basically, when three-state logic TTL 164 is enabled, the driver operates in a "push-pull" mode. Disabling three-state logic TTL 164 results in the driver behaving as a typical "open collector" driver.

The following table is a truth table illustrating the output at various points A and B of driver 160 for a STROBE signal when constructed in accordance with a preferred embodiment of the present invention.

TABLE I

| C | STROBE | A | B |
|---|---|---|---|
| 0 | 0 | 1 | 1 |
| 0 | 1 | D | D |
| 1 | 0 | 1 | H |
| 1 | 1 | 0 | 0 | where H = high impedance, C = driver control bit

In accordance with a preferred embodiment of the present invention, only drivers for STROBE and AUTOFD utilize the improved driver of the present invention. The remaining signals are driven by prior art drivers in an "open collector" configuration. Those skilled in the art will realize that the improved driver of the present invention may be utilized in various configurations and numbers depending on the implementation.

Figure 6:
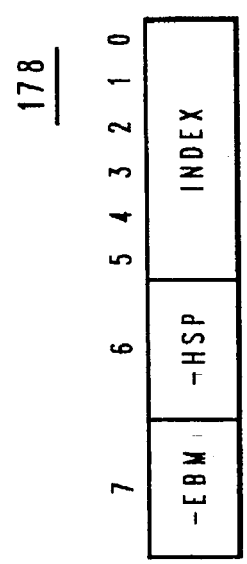
FIG. 6 depicts a high speed protocol bit for controlling a driver circuit constructed in accordance with a preferred embodiment of the present invention.

The driver may be controlled by parallel port logic 150 (FIG. 3) utilizing a high speed protocol bit as illustrated in FIG. 6. High speed protocol bit 178 is eight bits long and is located in an address reserved for the parallel port interface in the data processing system in accordance with a preferred embodiment of the present invention. Bits 0–5 are utilized as an index, and bit 6, driver control bit, is reserved for specifying the mode of the driver. Bit 7 is an enable bus master bit, in accordance with a preferred embodiment of the present invention. A "zero" at bit 6 indicates that a high speed mode protocol should be utilized over the parallel port interface. A "one" at bit 6 indicates that the open collector mode is to be utilized in sending signals over the parallel port interface. In accordance with a preferred embodiment of the present invention, the enabled bus master bit (bit 7) must be set low (logic "0") before bit 6 may be set low. As a result, high speed timings may be utilized only while operating in bus master mode in accordance with a preferred embodiment of the present invention. Otherwise, bit 7 will be set high (logic "1") when the data processing system is not in a bus master mode in accordance with a preferred embodiment of the present invention.

A driver control signal is output from parallel port logic 150 to interface unit 150 utilizing line 174. The driver control signal on this line follows the bit value in bit 6 of the high speed protocol bit. The driver control signal and the port control signal (i.e. STROBE or AUTOFD) are sent into logic unit 172, which ANDs the two signals. As mentioned above, the output of logic unit 172 is connected to enable input 176. This configuration ensures that three-state logic TTL 164 actively drives both high and low when the high speed mode is enabled. In a "open collector" mode, the three-state logic TTL 164 is enabled only when the port control signal is a logic "1" thereby making the "totem pole" driver operate as if it were an "open collector" driver.

The driver control bit may be set in various ways, in accordance with a preferred embodiment of the present invention. The driver control bit may be set by a user when designating a device for transmission between a data processing system and a device connected to the parallel port controller. A user also may comprise a person determining whether a particular device is compatible with a totem pole configuration or a user may comprise another entity, such as an application which determines whether or not the device is capable of communication utilizing a totem pole configuration. Additionally, the data processing system may poll the device connected to the parallel port interface to determine whether or not the device is capable of transmissions utilizing a totem pole configuration. Those skilled in the art will realize that various other methods may be utilized to determine compatibility of a totem pole configuration with the devices connected to the parallel port interface.

Figure 7:
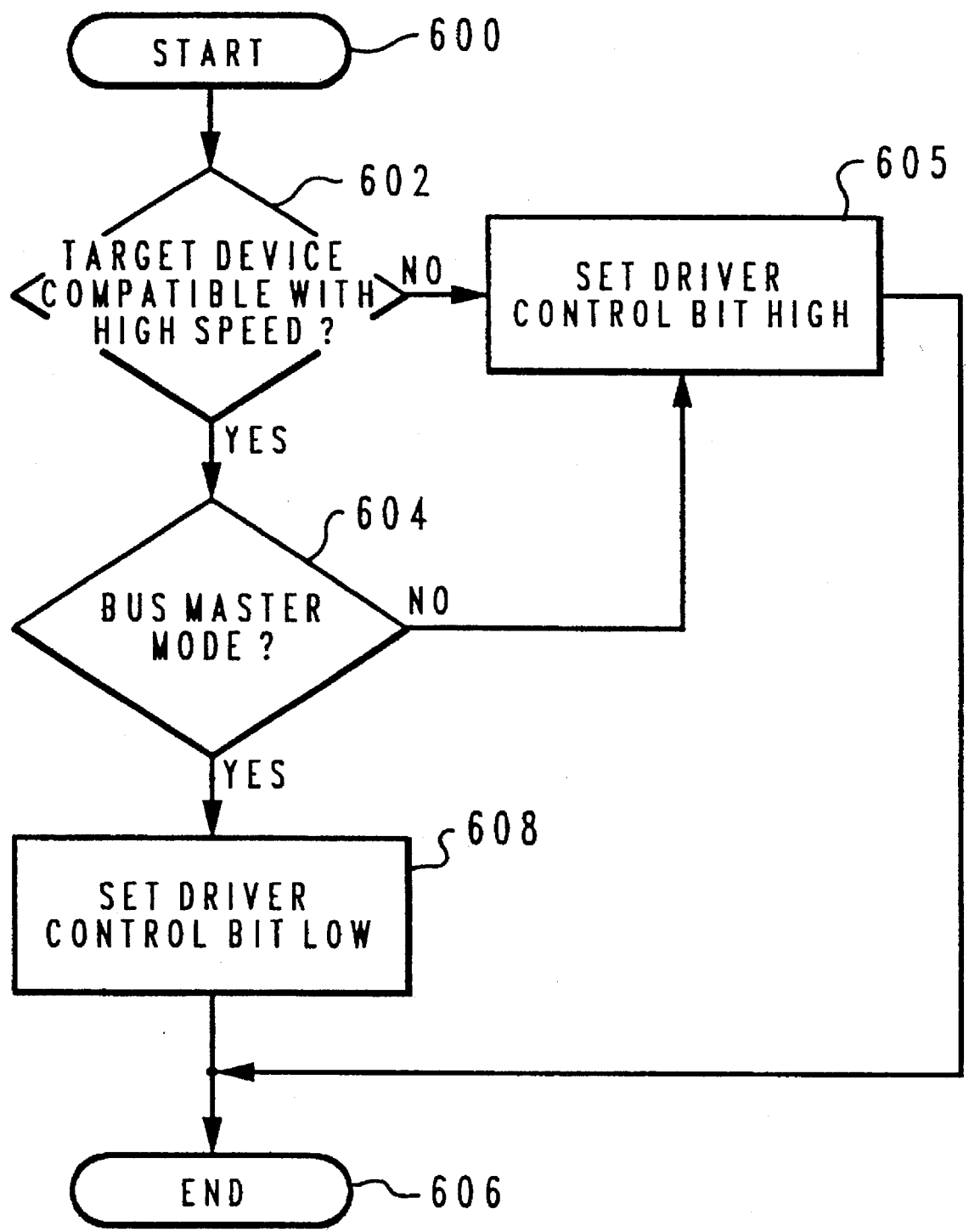
FIG. 7 is a high level flowchart of a process for controlling the driver circuit depicted in FIG. 5.

FIG. 7 is a high level flowchart of a process for controlling the driver circuit depicted in FIG. 5. A digital signal is transferred to a target device in a high speed mode when both the data processing system is operating in a bus master mode and the target device is capable of receiving signals in this manner. Although the depicted embodiment illustrates sending signals in a high speed mode only when both the data processing system is operating in a bus master mode and the target device is capable of receiving signals in this manner, other conditions for utilizing a high speed mode will be apparent to those skilled in the art. The only necessary requirement for utilizing a high speed mode for transmitting a digital signal is that the target device is capable of receiving signals in this fashion.

The process begins as illustrated in block 600 and thereafter proceeds to block 602, which illustrates a determination of whether or not the target device is compatible with the high speed mode provided when the driver circuit is emulating a totem pole circuit. This determination may be made by a user selecting the target device or by the data processing system automatically polling the target device to determine compatibility. If the target device is not compatible with the high speed mode, the process then proceeds to block 605, Which depicts the setting of the driver control bit in the high speed protocol bit illustrated in FIG. 6 high (logic "1"). Thereafter, the process terminates as depicted in block 606.

Referring back to block 602, if the target device is compatible with the high speed mode, the process then proceeds to block 604. Block 604 illustrates a determination of whether or not the data processing system is operating in a bus master mode. If the data processing system is not operating in a bus master mode, the process proceeds to block 604, which illustrates setting the driver control bit high (logic "1") in accordance with a preferred embodiment of the present invention. The process thereafter terminates again as illustrated in block 606.

Referring back to block 604, if the data processing system is operating in a bus master mode, the process then passes to block 608, which depicts the setting of the driver control bit low (logic "0"). Setting the driver control bit low results in the driver circuit operating in a "common collector" mode. Thereafter, the process terminates as illustrated in block 606.

One advantage of the driver of the present invention is that compatibility between standard "open collector" configurations is maintained while providing a high speed driver interface. As a result, existing applications and parallel port connect hardware which do not exploit the high speed interface driver may continue to operate unaffected. Devices and applications capable of utilizing higher speed timings may utilize the same parallel interface port in a high speed mode, without having to manually change configurations of the port.

While the invention has been particularly shown and described with reference to a preferred embodiment, it will be understood by those skilled in the art that various changes in form and detail may be made therein without departing from the spirit and scope of the invention.

What is claimed is:

1. A parallel port interface for utilization between a first device and a second device for transmitting a digital signal between said first device and said second device, said parallel port interface comprising:

a switchable driver circuit for transmitting said digital signal, said switchable driver circuit including:
   first circuit means for emulating an open collector circuit for providing active pull up;
   second circuit means for emulating a totem pole circuit for providing a high-impedance load;

polling means for polling said second device to determine whether said second device is configured to receive digital signals from said first circuit means or said second circuit means; and a logic control circuit for automatically selecting either said first circuit means or said second circuit means for transmitting said digital signal in response to the determination made by said polling means.

2. The parallel port interface of claim 1, wherein said polling means further includes means for polling said first device to determine whether said first device is capable of transmitting digital signals utilizing said second circuit means.

3. The parallel port interface of claim 2, wherein said first and second circuit means include:

an invertor having an input for receiving a digital signal;
   a three-state logic circuit having an input coupled to an output of said invertor, an enable input for switching said three-state logic circuit between a open collector configuration and a totem pole configuration, and an output transmitting said digital signal.

4. The parallel port interface of claim 3, wherein said logic circuit includes an AND gate having a first input coupled to an output of said invertor and a second input for receiving a control signal, wherein said switchable driver circuit may transmit selectively transmit signals in a open collector configuration or a totem pole configuration in response said digital signal and a control signal from said polling means.

* * * * *